Aug. 9, 1960    W. M. HOFFMAN    2,948,238
FLUID INJECTION DEVICE
Filed April 14, 1959
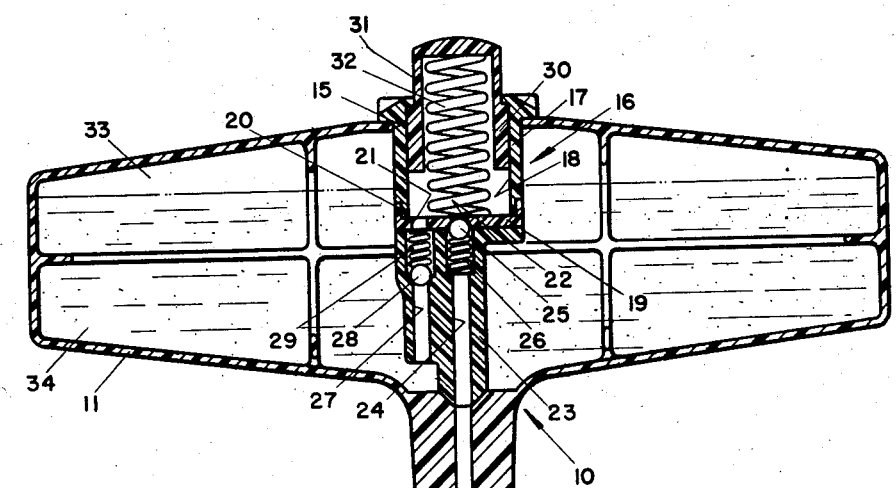
FIG. 2
FIG. 3
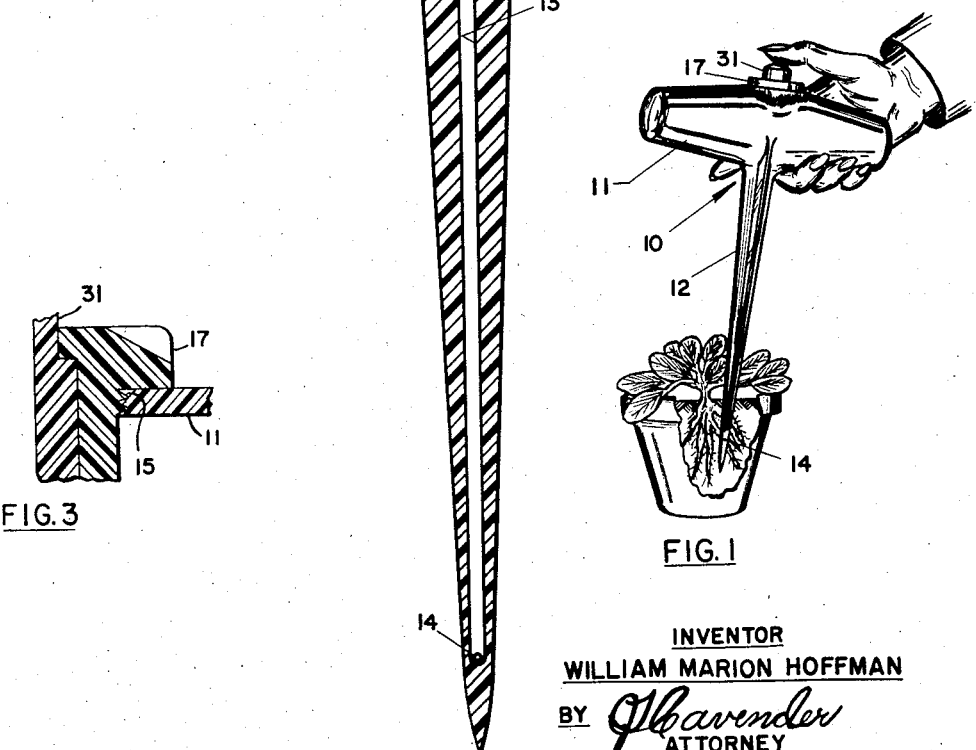
FIG. 1
INVENTOR
WILLIAM MARION HOFFMAN
BY *Cavender*
ATTORNEY

United States Patent Office 2,948,238
Patented Aug. 9, 1960

2,948,238

FLUID INJECTION DEVICE

William M. Hoffman, Dayton, Ohio, assignor of one-half to Frederic C. Von Derau, Dayton, Ohio Filed Apr. 14, 1959, Ser. No. 806,293

3 Claims. (Cl. 111—7.4)

This invention relates to fluid injection devices for injecting fluid treatments of chemical solutions and/or mixtures into the root systems of household plants, and the like, such fluids containing plant foods, insecticides, fungicides, trace elements, or other materials capable of correcting acidity or alkalinity and improving or protecting the growth thereof.

It is well-known to those familiar with the requirements for proper care of household type potted plants and the like that fertilizers and plant foods are periodically required either to supplement or to replenish the food taken from the soil during growth of the plant. Plant foods now in common use are normally mixed with a suitable amount of water to form a solution or mixture thereof which is thereafter poured on top of the soil held by the container for the plant. Alternatively, the plant container is provided with an opening at the bottom and the container then placed in a second container which holds a supply of plant food mixed with water.

Both of these procedures are generally unsatisfactory due to the fact that a substantial portion of the plant food is generally filtered out of the liquid carrier, by the portion of the soil contacted thereby, before the food reaches the actual feeding zone of the root system of the plant. Consequently, by repetitive use of either of the feeding procedures just mentioned, either the upper or the lower depth portions of soil within the container becomes extremely rich in plant food, whereas, that depth portion of the soil immediately surrounding the actual root system of the plant may actually be deficient of sufficient food for proper growth thereof.

Another problem generally encountered with the above feeding procedure is that the plant foods tend to form an impervious crust on the topmost surface of the soil to prevent proper aeration or breathing action of the soil and also inhibits absorption thereof of subsequently applied water. Additionally, the chemical content of many plant foods tends to react with the container itself to thus form, as a reaction product thereby, an unsightly mold-like crust which tends to "grow" on the exposed surface of the container.

Various attempts have heretofore been made to devise various types of root feeding devices which supply food directly to the root systems of shrubs and trees, and the like. However, such devices have been found to be completely lacking in the necessary control for supplying a precise measure of food concentration to the root system of the plant. Consequently, the soils and plants treated thereby are sometimes damaged instead of being improved by the injection procedure. Additionally, such devices have not proved commercially feasible as they are normally unduly complicated to manufacture and are therefore relatively expensive to purchase. Still another undesirable feature of such devices is that they require a constant source of liquid to be supplied thereto from a source such as an ordinary garden hose, and obviously are quite unsuitable for indoor use for potted plants.

Therefore, it is a primary object of the present invention to devise a new and improved fluid injection device for efficiently injecting, in a simple and economical manner, precisely controlled amounts of plant foods directly into the root systems of potted plants and the like.

Another object of the present invention is to devise a portable, self-contained fluid injection device for injecting plant foods directly into the root system of a potted plant in a simple, efficient and economical manner and in which device all of the aforesaid difficulties are alleviated.

In accordance with the present invention, such a novel fluid injection device for injecting fluids containing plant foods and soil treating chemicals into the root systems of household plants and the like, comprises a housing member having a substantially closed chamber therein adapted to contain such fluids. A tubular member, having one end affixed to the housing member, has the opposite end thereof adapted for insertion into the soil surrounding the root system of the plant, the tubular member being apertured to permit fluid flow therefrom. A fluid actuator is disposed within the chamber of the housing member and has formed therein an outlet fluid passage communicating with the fluid passage of the tubular member, an inlet fluid passage communication with the chamber of the housing member, and a bore communicating with both of the fluid passages. The fluid actuator further includes a piston slidably disposed within the bore thereof, a first valve means operable for closing communication between the actuator bore and the outlet fluid passage during outward movement of the piston whereby a measured amount of fluid is permitted to be withdrawn from the chamber of the housing member and into the bore of the fluid actuator, a second valve means operable for closing communication between the actuator bore and the inlet fluid passage during inward movement of the piston whereby the measured amount of fluid is permitted to be discharged from the actuator bore and into the tubular member. And a manually operable actuating means is operatively connected to the piston and is adapted for manipulation by the operator of the fluid injection device.

The feature of the present invention which are believed to be novel are set forth with particularity in the appended claims. The organization and manner of operation of the invention, together with further objects and advantages thereof, may best be understood by reference to the following drawing, in the several figures of which like reference numerals identify like elements, and in which:

Fig. 1 is a perspective view of a fluid injecting device constructed in accordance with the present invention, illustrating a preferred use of such device;

Fig. 2 is a longitudinal cross-sectional view of the injection device shown in Fig. 1; and Figure 3 is an enlarged view showing the means of connection between the actuator and housing.

With reference to Figs. 1 and 2 of the drawing, there is illustrated such a fluid injection device constructed in accordance with a preferred embodiment of the present invention. The device comprises a unitary housing member, indicated generally as 10, having a hollow and internally ribbed body portion 11 having formed therein a fluid chamber 33, and a fluted tubular member 12, all of which is preferably composed of any suitable easily moldable plastic material such as derivitives of cellulose, proteins, resins and the like. Tubular member 12 has a bore 13 centrally formed therein and has the opposite end thereof from body portion 11, terminating in a pointed configuration to aid insertion thereof into the soil surrounding the root system of a growing plant to be treated by operation of the device. Tubular member 12 additionally has a pair of oppositely disposed apertures 14 formed through the wall portion thereof and communicating with bore 13 to permit fluid flow therefrom.

The topmost wall portion of body member 11 has a circular opening 15 formed therein and is adapted for removably supporting within fluid chamber 33, a fluid-actuator indicated generally as 16 effectively threaded in the wall of body member 11. Actuator 16 comprises a cylindrical-shaped housing 17 having a substantially smooth circular bore 18 centrally formed therein. Affixed to the lower end of housing 17, as viewed, is a substantially flat disk-shaped member 19 having a circumferentially disposed upwardly projecting flange 20 in air-tight peripheral engagement with the lowermost projection of housing 17 and further having a pair of cylindrical-shaped bores 21 and 22 formed through the wall portion thereof. Fixedly secured to the downwardly projecting face of member 19, by suitable means not shown, is an elongated member 23 having the lower end thereof beveled and adapted to tightly engage a reversely-beveled depression formed in the upper end of tubular member 12 coaxially with respect to bore 13. Member 23 has an outlet fluid passage or bore 24 formed therein in axial alignment with respect to bore 13 of tubular member 12 and also disposed in axial alignment with respect to bore 22 of member 19, bore 24 thus providing fluid communication between bores 13 and 18 for purposes to be described hereinafter.

Normal communication between bores 13 and 18 is, however, effectively blocked or closed-off by means of a valve assembly disposed in the upper end of bore 24, which assembly comprises a smooth-surfaced, spherical-shaped and light-weight ball 25 spring urged by spring 26 into engagement with a smooth and beveled wall surface of bore 22, thus normally preventing fluid flow between bores 13 and 18. An inlet fluid passage or bore 27 is formed in member 23 in axial alignment with respect to bore 21, thus providing fluid communication between bore 18 and fluid chamber 33. Communication between bore 18 and fluid chamber 33, however, is effectively blocked or closed-off by means of a valve assembly disposed in the upper end of bore 27, which assembly comprises a smooth-surfaced, spherical-shaped light-weight ball 28 spring-urged by spring 29 into engagement with a smooth and beveled wall surface of bore 27, thus normally preventing fluid flow between bore 18 and the fluid chamber.

Disposed within and in peripheral surface contact with bore 18 is a circular piston 30, the outermost peripheral surface of which is adapted for air-tight sliding engagement with the internal circumferential surface of bore 18, thus forming a well-known vacuum-compression type chamber within bore 18. Piston 30 has a plunger or button-like projection 31 extending beyond body member 11 which is adapted for manual manipulation by the operator of the fluid injection device during normal operation thereof. Piston 30 is normally spring-urged in an outward direction, to the position shown, by means of a coiled spring 32 disposed within bore 18 and the hollow formed in piston 30 and actuator button 31.

A mode of operation of the just-described fluid injection device is as follows: Actuator 16 is first removed from fluid chamber 33 and the chamber is then filled with a suitable liquid such as ordinary tap water indicated as 34. Thereafter, a suitable amount of water-soluble fertilizer, or other soil treating chemicals as previously mentioned, is dissolved in the water contained in chamber 33, after which, fluid actuator 16 is replaced within the chamber and securely locked in position.

After the injector is fully charged with a supply of solution, initial depression of button 31 displaces piston 30 downward against the action of spring 32 and thereby expels the air initially contained within bore 18. When button 31 is released, piston 30 is deflected outwardly by action of spring 32 and thereby creates a partial vacuum within bore 18 in a well-known manner. Consequently, the liquid solution is withdrawn from fluid chamber 33 into inlet fluid passage 27 and thus forces ball 28 upwardly, and thereafter enters and fills the volume defined by the position of piston 30 within bore 18. After the piston is in the position, as shown, and bore 18 is completely filled with fluid, spring 29 forces ball member 28 downwardly to close further communication between bore 18 and the fluid chamber.

Thus when piston 30 is again moved downwardly by actuation of button 31, ball 25 is forced downwardly against the action of spring 26 and the fluid solution contained within bore 18 is ejected therefrom down through bores 24 and 13 and out of apertures 14 into the root system of any nearby plant. After piston 30 reaches its maximum downward position, spring 26 forces ball 25 upwardly to close further communication between bores 13 and 18 to prevent any further fluid flow therebetween. After button 31 is released, piston 30 is forced upwardly by action of spring 32 and a measured amount of fluid is again withdrawn from the chamber into bore 18 to completely fill the volume thereof.

The pointed end of tubular member 12 is easily insertable by the operator into the soil surrounding the root system of a plant as illustrated in Fig. 1, simply by gripping one of the elongated end portions of housing 11 and by exerting a downwardly directed force thereon. After tubular member 12 is inserted into the soil to a proper depth, by depressing button 31 to its extreme downward position a measured amount of fertilizer or other soil treating chemicals is injected into the root system of the plant. Upon release of button 31, a measured amount of fertilizer is withdrawn from chamber 33 and stored in bore 18 ready to be injected into the soil during a subsequent depression of button 31.

It is therefore quite evident that the novel self-contained fluid injection device, as constructed in accordance with the present invention, is extremely simple and economical to manufacture, and yet is capable of effectively injecting precisely controlled amounts of plant foods and other soil treating chemicals directly into the root systems of the plants in a simple and economical manner and whereby all of the aforesaid undesirable characteristics of prior methods and devices are alleviated.

While a particular embodiment of the present invention has been shown and described, it will be obvious to those skilled in the art of growing plants that changes and modifications may be made without departing from the invention in its broader aspects, and therefore, the aim in the appended claims is to cover all such changes and modifications as fall within the true spirit and scope of the invention.

What is claimed is:

1. A device for injecting fluids containing plant foods and the like into the root systems of household type plants and the like, comprising: a housing member having a substantially closed chamber therein adapted to contain said fluids; a tubular member having one end affixed to said housing member and having the opposite end thereof adapted for insertion into the soil surrounding the root system of said plants, said tubular member being apertured to permit fluid flow therefrom; and a fluid actuator removably disposed within said chamber, said actuator having a hollow projection depending therefrom in mating engagement with said one end of said tubular member such that the hollow constituting outlet fluid passage portion of said projection is substantially in axial alignment with respect to the fluid passage of said tubular member, an inlet fluid passage communicating with said chamber, and a bore communicating with both of said fluid passages, said actuator further including a piston slidably disposed within said bore, a first valve means operable for closing communication between said bore and said outlet fluid passage during outward movement of said piston whereby a measured amount of fluid is permitted to be withdrawn from said chamber into said bore, a second valve means operable for closing communication between said bore and said inlet fluid passage during inward movement of said piston whereby said measured amount of fluid is permitted to be discharged from said bore into said tubular member, and manually operable actuating means operatively connected to said piston and adapted for manipulation by the operator of said fluid injection device.

2. A device for injecting fluids containing plant foods and the like into the root systems of potted plants and the like, comprising: a substantially hollow housing member adapted to contain said fluids; a tubular member having one end integrally formed with respect to said housing and having the opposite end pointed to aid insertion thereof into the soil surrounding the root system of said plants, said tubular member having a plurality of apertures formed therein to permit fluid flow therefrom; and a fluid actuator removably disposed within said chamber, said actuator having a hollow and tapered projection depending therefrom in engagement with a mating depression formed in said one end of said tubular member such that the hollow constituting outlet fluid bore portion of said projection is in substantial axial alignment with respect to the bore of said tubular member, an inlet fluid bore communicating with the interior of said housing member, and a circular bore communicating with both of said fluid bores, said actuator further including a piston slidably disposed within said circular bore, a first valve means associated with said circular bore and said outlet fluid bore to close communication therebetween during outward movement of said piston whereby a measured amount of fluid is permitted to be withdrawn from the interior of said housing member into said circular bore, a second valve means associated with said circular bore and said inlet fluid bore for closing communication therebetween during inward movement of said piston whereby said measured amount of fluid is permitted to be discharged from said circular bore into said tubular member, said piston having an axial projection extending beyond said housing member and adapted for manipulation by the operator of said fluid injection device.

3. A device in accordance with claim 1, in which said fluid actuator is threaded in said housing member such that said depending projection thereof is continually held in tight engagement with said one end of said tubular member.

References Cited in the file of this patent

UNITED STATES PATENTS

| | | |
|---|---|---|
| 1,075,459 | Bowman | Oct. 14, 1913 |
| 1,865,990 | Wilcox | July 5, 1932 |
| 1,986,343 | Iskyan | Jan. 1, 1935 |
| 1,997,097 | Bartlett | Apr. 9, 1935 |
| 2,707,579 | Vincent | May 3, 1955 |